July 27, 1954
M. ROY
2,684,817
AIRCRAFT POWERED BY RAMJET UNITS
Filed Sept. 4, 1951
2 Sheets-Sheet 1
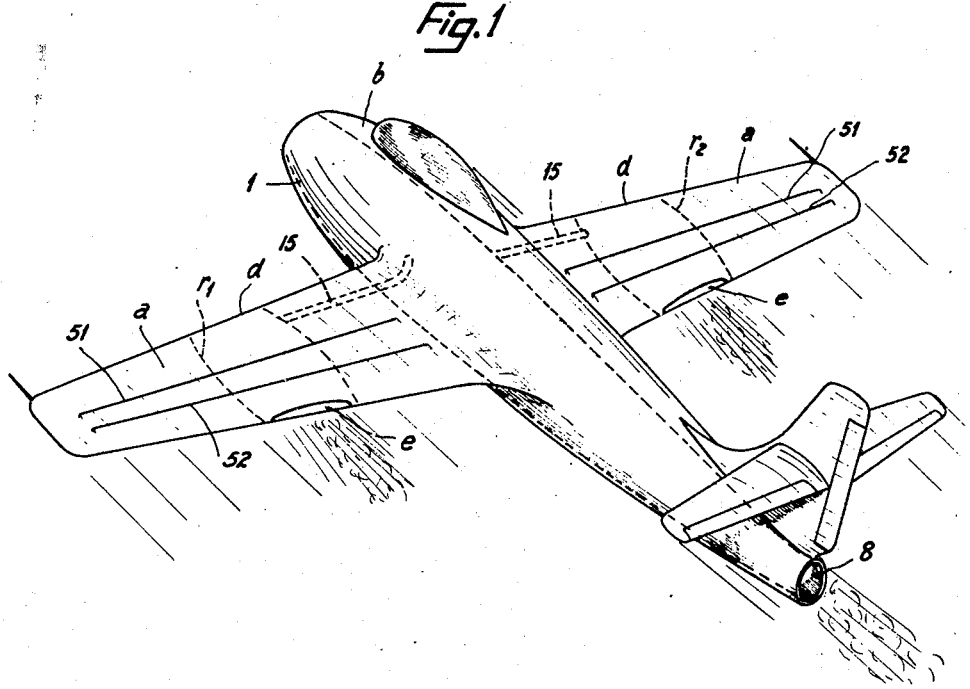
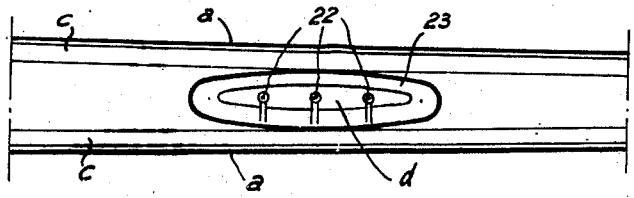
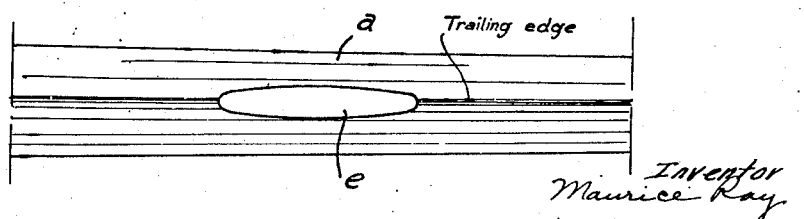

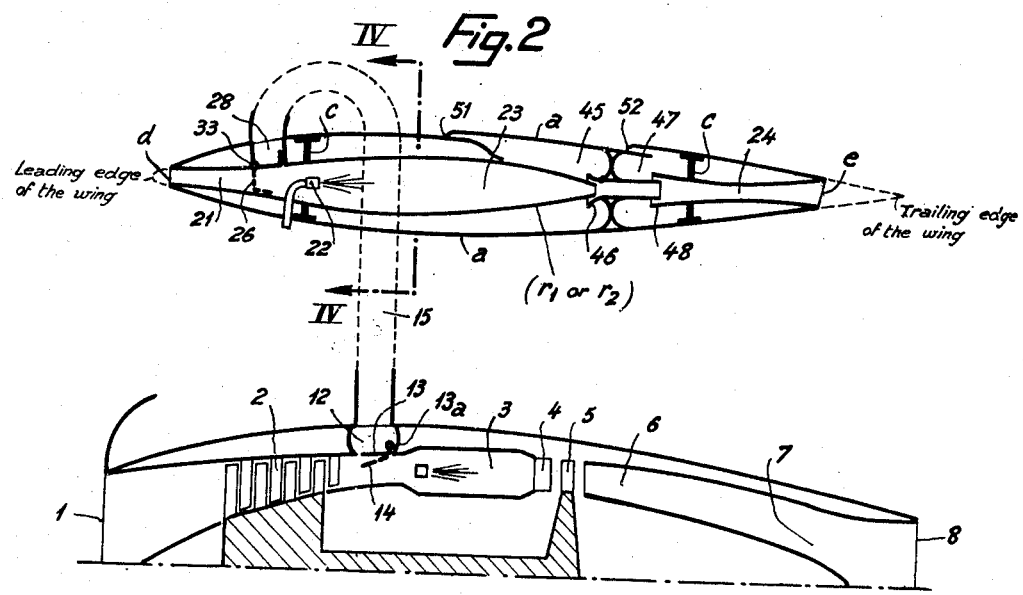
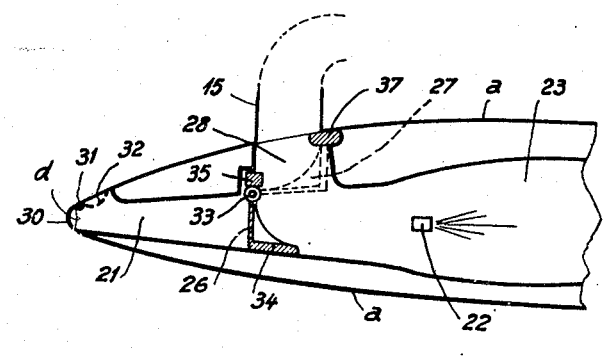

Patented July 27, 1954

2,684,817

UNITED STATES PATENT OFFICE 2,684,817

AIRCRAFT POWERED BY RAMJET UNITS

Maurice Roy, Paris, France, assignor to Societe Nationale d'Etude et de Construction de Moteurs d'Aviation, Paris, France, a company of France Application September 4, 1951, Serial No. 245,059

Claims priority, application France July 21, 1947

3 Claims. (Cl. 244—15)

The present application for a patent is a continuation in part of my Patents 2,587,227 and 2,577,919.

Jets units of the type including an aircompressor driven by a reciprocating engine or a gas turbine, are nowadays outclassed by ramjet units—also known as athodyds—in which compression is obtained by the ram effect of ambient air, in relative motion. However this type of engine requires a relatively high speed before it becomes operative, and has a poor efficiency at lower speeds. In particular, it cannot produce any propelling thrust when the aircraft is stationary and hence take-off is impossible. A special additional propelling system is therefore required for taking off and gathering speed.

In my Patent No. 2,577,919, I have described a power plant for aircraft comprising, in combination, a compressorless athodyd and a turbojet engine, the latter being capable of producing a sufficient thrust for taking off and gathering speed, and further of supplying air, discharged by its compressor, to the athodyd, at low-speed flight. A valve device is provided for closing the air intake of the athodyd at low-speed flight and opening the duct connecting it to the compressor of the turbojet engine; on the other hand, this valve device is designed for opening the air intake of the athodyd at high-speed flight and closing the duct between it and the compressor of the turbojet. In this latter case, the athodyd operates independently of the turbojet.

My invention concerns a new arrangement of athodyds on an aircraft which allows of using these engines in a very efficient way and which may furthermore be combined with the above device described in my Patent No. 2,577,919, in such a way that the athodyds are fed, during and after take-off, with air discharged by the compressor of the turbojet, and therefore they produce a thrust.

An object of my invention is to dispose athodyds, in an even number, symmetrically about the longitudinal plane of symmetry of the aircraft, inside the wings thereof, the athodyds having for this purpose a flattened shape of oval cross-section, in order to allow housing these engines inside the wings. The air inlet of these athodyds is in the shape of an oblong slot and is located on the leading edge of the wing, whereas the outlet for the exhaust of the propelling jet which is also in the shape of an oblong slot, is located on the trailing edge of the wing or of a flap hinged to the wing, this flap being crossed by a flat conduit which forms the rear portion of the reaction nozzle of the athodyd.

A further object of my invention is to provide the flattened athodyds located in the wings with ejectors operated by the exhaust gas of the athodyds and associated with mixers connected to suction slots for sucking up the limiting layers of the air flowing along the wings. Owing to the fact that the athodyds are located inside the wings, it is possible to have direct connection, of very short length, between the ejectors and the suction slots on the wings, so that very efficient suction of the limiting layers of air can be achieved.

In combining my invention with the turbojet device described in my Patent No. 2,577,919, it is possible to construct a compound power plant including turbojet and ramjet units, which avoids the present drawback of ramjets, viz. the unableness to ensure take-off, while allowing high-speed flight with an excellent efficiency.

Other objects and advantages of the invention will be apparent during the course of the following description.

In the accompanying drawing forming a part of this invention and in which like numerals are employed to designate like parts throughout the same, Fig. 1 is a diagrammatic perspective view of an aircraft powered by a compound jet propulsion plant according to the invention, Fig. 2 diagrammatically illustrates the device for associating an athodyd with a turbojet engine, the latter being shown in half axial section, Fig. 3 is a view on an enlarged scale of the front portion of an athodyd belonging to the arrangement of the invention, Fig. 4 is a cross-section taken along line IV—IV of Fig. 2, Fig. 5 is an elevation showing the trailing edge of a wing and the athodyd exhaust outlet located on said edge.

The aircraft shown by way of example, in Fig. 1 comprises, inside its two wings $a$, flat ramjet engines or athodyds $r_1$ and $r_2$ respectively. Owing to its flattened shape, each athodyd can be housed inside the corresponding wing, without altering the aerofoil section thereof and without resorting to the usual bulges required for fitting up turbojets whose cross-section is necessarily circular because of the rotary compressor and turbine.

Fig. 4 shows a cross-section 23 of the athodyd. This section has an oval shape whose main axis extends parallelly to the wing. The air inlet $d$ of this athodyd is in the shape of an oblong slot and is located on the leading edge of the wing. The exhaust outlet $e$ (Fig. 5) of the athodyd for the issue of the propelling jet is also in the shape of an oblong slot, but it is located on the trailing edge of the wing. The jet issuing from each of the athodyds $r_1$, $r_2$ is therefore a flat and thin jet extending along a certain length of the wing; this feature substantially enhances efficiency.

The axially located fuselage $b$ of the aircraft (Fig. 1) contains a turbojet unit including a compressor and a turbine, and having its air inlet 1 towards the front of the aircraft and its reaction nozzle opening out at 8, towards the rear of the aircraft. The discharge of the compressor of the turbojet unit can be connected, through a piping 15 arranged inside the wings, to the combustion chamber of each of the athodyds $r_1$, $r_2$ during take-off and at low-speed flight.

The turbojet unit shown in half axial section in Fig. 2 has its front air intake at 1, an axial-flow compressor 2, a combustion chamber 3, a gas turbine 4—5 for driving the compressor, and a nozzle 6—7 for the exhaust of the reaction jet through the outlet 8 whose passage cross-section can be adjusted by any suitable means (not shown).

At the delivery end of the compressor 2, a tapping of air under pressure can be effected by actuating movable throttles or valves, the outline of which is designed to reduce to a minimum eddies and pressure loss in the main flow of air and in the tapped flow. I have illustrated in Fig. 2 such a throttle arrangement which is constituted by a flap valve 13 pivotally mounted at 13a and adapted to move into a position 14 according to the output to be obtained. This flap valve allows tapping of a part of the flow of compressed air into a compartment 12 communicating, through a pipe 15 (in dotted line) located inside the wing, with a corresponding compartment 28 upstream of the burners 22 of the ramjet or athodyd shown in longitudinal section. This athodyd of flattened shape as stated above, which includes an air intake or diffusor 21, a combustion chamber 23 and a reaction nozzle 24, is wholly housed within the volume bounded by the surfaces of the wing a whose longitudinal girders are seen at c. Its front portion is shown on an enlarged scale in Fig. 3.

When the aircraft takes off or flies at a low speed, the inlet slot d of the air intake 21 which lies on the leading edge of the wing, is obturated by a gill 30 pivoted at 31. At the same time, a flap 26 pivoted at 33 closes fluidtightly, through the agency of packings such as 34 and 35, the diffusor 21, while putting the compartment 28 fed by the compressor of the turbojet unit, in communication with the combustion chamber 23 of the ramjet unit.

The association of the turbojet and ramjet units, in the manner disclosed, forms thus a compound reaction jet plant with three flows of air.

At high-speed flight the gill 30 of each athodyd is moved from the inlet slot d, to the position 32, so as to open wide the input into the diffusor 21. The flap valve 26 recedes into the position 27 in which it presses against a fluidtight packing 37 and it is locked in said position by any known, suitable means. The valve 13 moves to cut off compartment 28 from the delivery end of the compressor of the turbojet unit.

The extrados or upper surface of each wing is provided with two slots 51 and 52 extending along the wings and serving for the suction of the boundary layers of air. These slots feed respectively chambers 45 and 47 arranged inside the wing and connected to two mixers 46 and 48 of a double-exhaust ejector.

The high-temperature gases issuing from the combustion chamber 23 and flowing through these mixers towards the reaction nozzle 24 which ends with a flattened outlet e, give rise to a depression in the chambers 45 and 47, so that the boundary layers of air on the upper surface of the wing are sucked up, through the slots 51 and 52, into the chambers 45 and 47. This air enters the mixers 46, 48 in which it mixes with the gases flowing to the nozzle 24 for forming the flat propelling jet issuing through the outlet e. This suction of the boundary layers of air obviously takes place whether the athodyd is supplied with compressed air by the compressor of the turbojet, or operates independently.

It is to be noted that, since the flattened athodyds are wholly located within the overall dimensions of the wings, the sucking up of the boundary layers is carried out in the best conditions, as the connections between the slots 51, 52 on the wings and the mixers 46, 48 are the most direct and shortest possible ones.

It is to be understood that the form of the invention herewith shown and described is to be taken as a preferred example of the same and that various changes in the shape, size and arrangement of parts may be resorted to without departing from the spirit of the invention or the scope of the subjoined claims.

What I claim is:

1. In a hollow aircraft wing, a flat oval-shaped ramjet unit having part of its wall spaced from the wing surfaces and bounding therewith a chamber inside said wing, said unit comprising a frontal air intake passage opening out on the leading edge of said wing and a rear exhaust nozzle adapted to form a high-velocity gaseous jet, a rearwardly directed ejector tube cooperating with said exhaust nozzle and adapted to suck up fluid from said chamber when said jet flows therethrough and to discharge through an outlet on the trailing edge of said wing, and a slot-like passage extending along the wing-span, on the upper surface of said wing, and communicating with said chamber.

2. The combination as recited in claim 1, wherein said chamber forms an airtight enclosure communicating with said slot-like passage and said ejector tube and extends along the wing-span.

3. The combination as recited in claim 1, further comprising a second chamber inside said wing separated from the first-mentioned chamber by a substantially airtight partition, said ejector tube extending across said partition, a second ejector tube cooperating with said first-mentioned ejector tube and adapted to suck up fluid from said second chamber when a jet issues from said first-mentioned ejector tube and to discharge through said outlet, and a second slot-like passage extending along the wing-span, on the upper surface of said wing, generally parallel to said first-mentioned slot-like passage, and communicating with said second chamber.

References Cited in the file of this patent

UNITED STATES PATENTS

| Number | Name | Date |
| --- | --- | --- |
| 2,346,178 | Mercier | Apr. 11, 1944 |
| 2,453,721 | Mercier | Nov. 16, 1948 |
| 2,501,078 | Newcomb | Mar. 21, 1950 |
| 2,514,513 | Price | July 11, 1950 |
| 2,553,443 | Davis | May 15, 1951 |
| 2,577,919 | Roy | Dec. 11, 1951 |

FOREIGN PATENTS

| Number | Country | Date |
| --- | --- | --- |
| 246,882 | Switzerland | Oct. 16, 1947 |